United States Patent [19]

Sato

[11] Patent Number: 5,639,159

[45] Date of Patent: Jun. 17, 1997

[54] APPARATUS FOR MIXING, KNEADING AND EXTRUDING MATERIAL

[75] Inventor: Takuya Sato, Suita, Japan

[73] Assignee: Sato Iron Works Co., Ltd., Japan

[21] Appl. No.: 628,595

[22] Filed: Apr. 5, 1996

[30] Foreign Application Priority Data

Feb. 23, 1996 [JP] Japan ................... 8-036046

[51] Int. Cl.6 .................... B29B 7/46; B29B 7/82; B29B 7/84
[52] U.S. Cl. .................... 366/75; 366/76.3; 366/82; 366/84; 366/91; 366/145; 366/147; 366/149; 366/158.1; 366/307; 425/199; 425/203; 425/205; 425/378.1
[58] Field of Search .................. 366/75, 76.3, 79–85, 366/88–91, 145, 147, 149, 156.1, 158.1, 158.2, 158.3, 307, 319, 322; 323/425; 203/204, 208, 209, 205, 199, 378.1

[56] References Cited

U.S. PATENT DOCUMENTS

| 2,524,999 | 10/1950 | Schulerud | 366/158.2 X |
| 2,640,033 | 5/1953 | Marshall | 425/199 X |
| 4,090,829 | 5/1978 | Fischer et al. | 425/199 X |
| 4,127,372 | 11/1978 | Perla et al. | 425/205 X |
| 4,408,887 | 10/1983 | Yamaoka | 366/75 |
| 5,055,027 | 10/1991 | Sato | 366/82 X |
| 5,370,456 | 12/1994 | Yamaoka | 366/80 |

*Primary Examiner*—Charles E. Cooley
*Attorney, Agent, or Firm*—Webb Ziesenheim Bruening Logsdon Orkin & Hanson, P.C.

[57] ABSTRACT

An apparatus for mixing and kneading raw materials, such as soap, and extruding the mixture into a predetermined shape. The apparatus includes a cylinder having a rotatable plodder worm shaft, a levigating mechanism disposed at a longitudinal position of the cylinder and including a rotary disc and a fixed disc fixed to the cylinder. The rotary disc and the fixed disc are disposed side by side along the axial direction of the plodder worm shaft and define a plurality of through holes allowing passage of the material in the axial direction. A flow passage forming member is disposed within a moving passage of the material between the rotary disc and the fixed disc and forms a flow passage allowing passage therethrough of fluid maintained at a predetermined temperature. A fluid supplying/exhausting device is provided for supplying the fluid at a predetermined flow rate to the flow passage and exhausting the fluid from the flow passage forming member.

8 Claims, 9 Drawing Sheets

APPARATUS FOR MIXING, KNEADING AND EXTRUDING MATERIAL

BACKGROUND OF THE INVENTION

1. Field of the Invention

The present invention relates to a mixing-kneading extruder apparatus, and more particularly to a mixing-kneading extruder apparatus for mixing and kneading soap chips as raw material of soap or chemical materials such as various kinds of fat and oil and extruding the mixture into a predetermined shape.

2. Description of the Related Art

In a manufacturing process of e.g. soap, the temperature of the raw materials significantly affects workability and quality of the final product. In particular, it is important in the manufacture that the heat generated due to friction associated with compression and mixing/kneading of the raw soap material (material to be processed) in the course of the mixing/kneading and extruding process be adjusted so as to maintain the processed material at an appropriate temperature.

In the conventional mixing-kneading extruder apparatus of the above-noted type, a water passage is coaxially provided in an outer periphery of a cylinder incorporating therein a plodder worm shaft. In operation, by causing cooling water to flow through the water passage, heat exchange takes place between the processed material kneaded and extruded by the plodder worm shaft and an inner peripheral surface of the cooled cylinder, thereby to control the temperature of the processed material.

With the above arrangement, the conveying or plodding operation of the material by the plodder worm shaft may be effected efficiently, with avoiding co-rotation between this worm shaft and the material.

However, the temperature elevation in the processed material tends to take place at a levigating mechanism of the apparatus at which the material is subjected to a levigation treatment. And, with the above-described arrangement, there is a limit in positively controlling the temperature of the processed material at such area.

Further, with the conventional construction, the cooling is effected for only the outer periphery of the cylinder. Thus, the plodded material may be cooled only at the portion of thereof directly contacting with the inner periphery of the cylinder (i.e. the outer peripheral portion of the material), while the remaining portion of the material located adjacent the plodder worm shaft remains un-cooled directly, so that the temperature tends to rise at this portion.

That is to say, when the material is viewed along the cross section of the cylinder, the outer material portion adjacent the inner peripheral surface of the cylinder may be maintained at a relatively low temperature, while the inner portion thereof adjacent the plodder worm shaft tends to experience temperature rise. Accordingly, the temperature of the processed material varies in the radial direction of the cylinder, whereby quality irregularity occurs in the final product made from this material.

Depending on the kind of soap, it is not sufficient just to restrict the rise in the material temperature. It is further necessary to manufacture the product while maintaining the soap material, i.e. the processed material, at a predetermined elevated temperature such as 40° to 45° C. higher than the normal temperature. In such case, contrary to the above-described case, it becomes necessary to maintain the processed material at a predetermined elevated temperature. For this purpose, instead of the cooling water, heating water is used for maintaining the material at the predetermined elevated temperature. Like the foregoing case, in this case too, while the temperature of the portion of the material adjacent the inner peripheral surface of the cylinder may be relatively well controlled, it is difficult to effectively control the temperature of the remaining material portion located adjacent the plodder worm shaft.

The present invention attends to the above-described shortcomings of the prior art and its primary object is to provide an improved mixing-kneading extruder apparatus capable of effectively controlling the temperature of processed material such as raw soap material in the vicinity of a levigating mechanism thereof when the material is to to be processed at a predetermined temperature within a cylinder, minimizing irregularity in the temperature of the material in the radial direction of the cylinder, and providing a final product with uniform quality.

SUMMARY OF THE INVENTION

For accomplishing the above-noted object, a mixing-kneading extruder apparatus, according to the present invention, comprises:

a cylinder incorporating therein a plodder worm shaft rotatable relative thereto for plodding material to be processed in an axial direction of the shaft;

a levigating mechanism disposed at a predetermined longitudinal position of the cylinder for levigating the material, the levigating mechanism including a rotary disc rotatable with the plodder worm shaft and a fixed disc fixed to the cylinder, with the rotary disc and the fixed disc being disposed side by side along the axial direction of the plodder worm shaft, said rotary disc and said fixed disc respectively defining a plurality of through holes for allowing passage of the material in the axial direction;

a flow passage forming member disposed within a moving passage of the material between the rotary disc and the fixed disc and forming therein a flow passage for allowing passage therethrough of fluid maintained at a predetermined temperature; and fluid supplying/exhausting means for supplying the fluid of the predetermined temperature at a predetermined flow rate to the flow passage of the flow passage forming member and exhausting the fluid from the flow passage forming member.

With the above-described mixing/kneading extruder apparatus, in association with rotation of the plodder worm shaft, the material is mixed and kneaded while being caused to move within and along the axial direction of the cylinder. And, at the levigating mechanism in the course of passage through the through holes defined in the fixed disc and the rotary disc under rotation relative to each other, the material is levigated as being subjected to compression, dicing and shearing actions from the relative rotation between the two discs. Further, since the cross sectional area within the cylinder along which the material is caused to be moved is smaller than a total cross sectional area of the through holes defined in the discs, the moving direction and the moving speed of the material are varied, whereby the material may be sufficiently mixed and kneaded.

Now, in the case of the mixing-kneading extruder apparatus according to the present invention, heat exchange is caused to take place between the fluid maintained at the predetermined temperature and supplied by the fluid supplying/exhausting means into the flow passage forming member and the material moved outside this flow passage forming member, so that the material may be adjusted within a predetermined temperature range.

This will be described more specifically, by taking for an example a case where cooling is effected in the levigating mechanism.

When the material is subjected to a levigating action by the levigating mechanism, heat is generated in the material in association therewith. However, according to the apparatus of the invention, cooling water is fed into the flow passage forming member so that heat exchange takes place between the cooling water passing inside the flow passage forming member and the material moved outside this member, whereby the material may be appropriately cooled. In this, the amount of the cooling water may be controlled, i.e. increased or decreased, depending on the amount of the heat generated in the material. Therefore, by supplying a controlled amount of the fluid maintained at a predetermined temperature, e.g. the cooling water, into the flow passage forming member, the temperature of the material to be processed may be controlled appropriately.

Moreover, in the construction of the present invention, the flow passage forming member comes into direct contact with the material. Then, this member may be constructed as a simple piping. And, with such simple piping, the temperature of the material may be controlled efficiently.

Further, in the case of the construction of the present invention, the flow passage forming member is disposed between the fixed disc and the rotary disc, the temperature control of the material may be effected at a position where the material is most likely to experience a temperature variation, so that it becomes possible to maintain high quality of the final product.

According to a further aspect of the invention, the flow passage forming member disposed within the moving passage of the material includes an inner flow passage portion disposed radially inwardly relative to an axis of the moving passage and an outer flow passage portion disposed radially outwardly relative to the passage axis.

With the above-described feature, the flow passage forming member through which the temperature-controlled fluid is caused to flow includes an inner flow passage portion and an outer flow passage portion. Then, of the material being moved, a portion thereof located adjacent the axis of the moving passage, i.e. radially inwards relative thereto, may be temperature-controlled by the fluid flowing through the inner flow passage portion, whereas, the other material portion located radially outwards relative to the passage axis may be temperature-controlled by the fluid flowing through the outer flow passage portion. Therefore, the temperature control of the material may be effected uniformly and effectively in the radial direction of the moving passage.

As a result, the above construction has solved the problem of the convention of the unevenness of the temperature of the material in the radial direction, whereby the resultant final product may have further uniformity in its quality.

According to a still further aspect of the invention, the flow passage forming member and the fixed disc are disposed one after another in the mentioned order from the upstream side in a moving direction of the material.

The material to be processed by the present invention comprises soap-chip mixed/kneaded material or various oils and fats, which tend to have relatively high viscosity. Then, the flow passage forming member is subjected to significant load from the material in the direction from the upstream side to the downstream side in the axial direction which corresponds to the moving or plodding direction of the material, such that this flow passage forming member may be warped or distorted to the downstream side and come into contact with the fixed disc. In this respect, according to the above-described construction of the invention, the flow passage forming member is firmly supported by the fixed disc, whereby the passage forming member may be prevented from coming into contact with the rotary disc to damage this disc.

Preferably, the mixing-kneading extruder apparatus of the invention further comprises a cylinder outer-periphery temperature controlling device disposed around an outer periphery of the cylinder and forming therein a flow passage through which fluid may pass.

In the case of the above construction, the cylinder outer-periphery temperature controlling device may effect temperature control of the material before and until this material is moved to reach the levigating mechanism. On the other hand, the temperature control of the material within the levigating mechanism where the temperature tends to vary may be effected by means of the fluid flowing inside the flow passage forming member incorporated within this levigating mechanism.

Accordingly, the temperature control of the relatively loosely kneaded material being plodded by the plodder worm shaft may be effectively carried out through the heat exchange occurring from the outer periphery of the cylinder. Whereas, at the levigating mechanism where the material is subjected to a strong levigating action, the temperature control may be effectively carried out not only at the radially inner portion of the cylinder, but also from the inside of the material per se.

Further, the extruder apparatus may be constructed as a double-stage type having a second mixing-kneading section including a cylinder and a plodder worm shaft and disposed downstream of the levigating mechanism. In this case, the material is levigated and uniformly temperature-controlled through the levigating mechanism disposed at the trailing end of the first mixing-kneading section. Thereafter, while being maintained with this temperature distribution uniformity in the radial direction, the material may then be further mixed and kneaded by the second mixing-kneading section. As a result, it becomes possible to obtain a final product with further improved workability and quality.

For accomplishing the above-noted object of the invention, the mixing-kneading extruder apparatus may be alternatively constructed as follows.

Namely, a mixing-kneading extruder apparatus, according to a still further aspect of the invention, comprises:

a cylinder incorporating therein a plodder worm shaft rotatable for plodding material to be processed therewith;

a levigating mechanism disposed at a longitudinal terminal end of said cylinder for levigating the material; the levigating mechanism including a rotary disc rotatable with the plodder worm shaft and a fixed disc fixed to the cylinder, with the rotary disc and the fixed disc being disposed side by side along the axial direction of the plodder worm shaft, said rotary disc and said fixed disc respectively defining a plurality of through holes for allowing passage of the material in the axial direction;

a degassing tank disposed in the middle of a conveying passage of the material, the degassing tank having an inner space thereof evacuated, said levigating mechanism being disposed adjacent an entrance of the degassing tank for introducing the material;

a through hole provided on the downstream side of the fixed disc and the rotary disc relative to a transporting direction of the material and in communication with said inner space of the degassing tank for allowing passage of the material therethrough;

an end face flow passage forming member disposed on the downstream side of the fixed disc and the rotary disc relative to the transporting direction of the material and in communication with said inner space of the degassing tank and forming therein a flow passage for allowing passage of fluid therethrough; and fluid supplying/exhausting means for supplying the fluid of the predetermined temperature at a predetermined flow rate to the flow passage of the end face flow passage forming member and exhausting the fluid from the end face flow passage forming member.

With the above-described mixing/kneading extruder apparatus, like the foregoing construction, in association with rotation of the plodder worm shaft, the material is mixed and kneaded while being caused to move within and along the axial direction of the cylinder. And, at the levigating mechanism in the course of passage through the through holes defined in the fixed disc and the rotary disc under rotation relative to each other, the material is levigated as being subjected to compression, dicing and shearing actions from the relative rotation between the two discs. Further, since the cross sectional area within the cylinder along which the material is caused to be moved is smaller than a total cross sectional area of the through holes defined in the discs, the moving direction and the moving speed of the material are varied, whereby the material may be sufficiently mixed and kneaded.

Now, in the case of the mixing-kneading extruder apparatus according to the present invention, heat exchange is caused to take place between the fluid maintained at the predetermined temperature and supplied by the fluid supplying/exhausting means into the end face flow passage forming member and the material moved outside this flow passage forming member, so that the material may be adjusted within a predetermined temperature range.

In addition, since this end face flow passage forming member comes into direct contact with the material to be processed, the temperature control of this material may be effected effectively and efficiently.

Further, in the levigating mechanism of this mixing-kneading extruder apparatus, the end face flow passage forming member thereof disposed in the conveying passage of the material for controlling the temperature of the material is disposed in opposition to and communication with the inner space of the degassing tank. Accordingly, it is possible to appropriately control the material whose temperature has varied due to the levigating action from the fixed disc and the rotary disc or the like immediately before this material is introduced into the degassing tank. Further, since this degassing tank has free inner space, i.e. the evacuated inner space, it is also possible to readily effect a maintenance operation of the end face flow passage forming member by utilizing this free space for access thereto.

In the above-described construction, preferably, the end face flow passage forming member includes a plate-like member disposed within the moving passage of the material transversing its moving direction and defining a groove. A lid member is provided for covering the groove by engaging the plate-like member along a width thereof. The flow passage for allowing passage therethrough of the fluid at the predetermined temperature is formed by a space defined between the plate-like member and the lid member.

As described hereinbefore, in disposing the end face flow passage forming member within the moving passage of the material adjacent an opening of the passage, this passage forming member needs to have a sufficient strength against warping thereof, and also the through holes of this passage forming member should be as large as possible so as to minimize the effect of the plodding load to be transmitted to the upstream side of the apparatus.

In the above respect, the above described construction is advantageous, namely, the construction in which the end face flow passage forming member includes a plate-like member defining a groove therein and a lid member is provided for covering this groove, with the plate-like member and the groove together forming therebetween the space as the flow passage for allowing passage therethrough of fluid for temperature adjustment. That is, with this construction, the through passage for the material may be formed large and also the flow passage of relatively complex arrangement may be formed relatively easily.

As a result, the temperature control of the processed material may be effected effectively and also the disadvantageous increase in the conveying load may be avoided.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
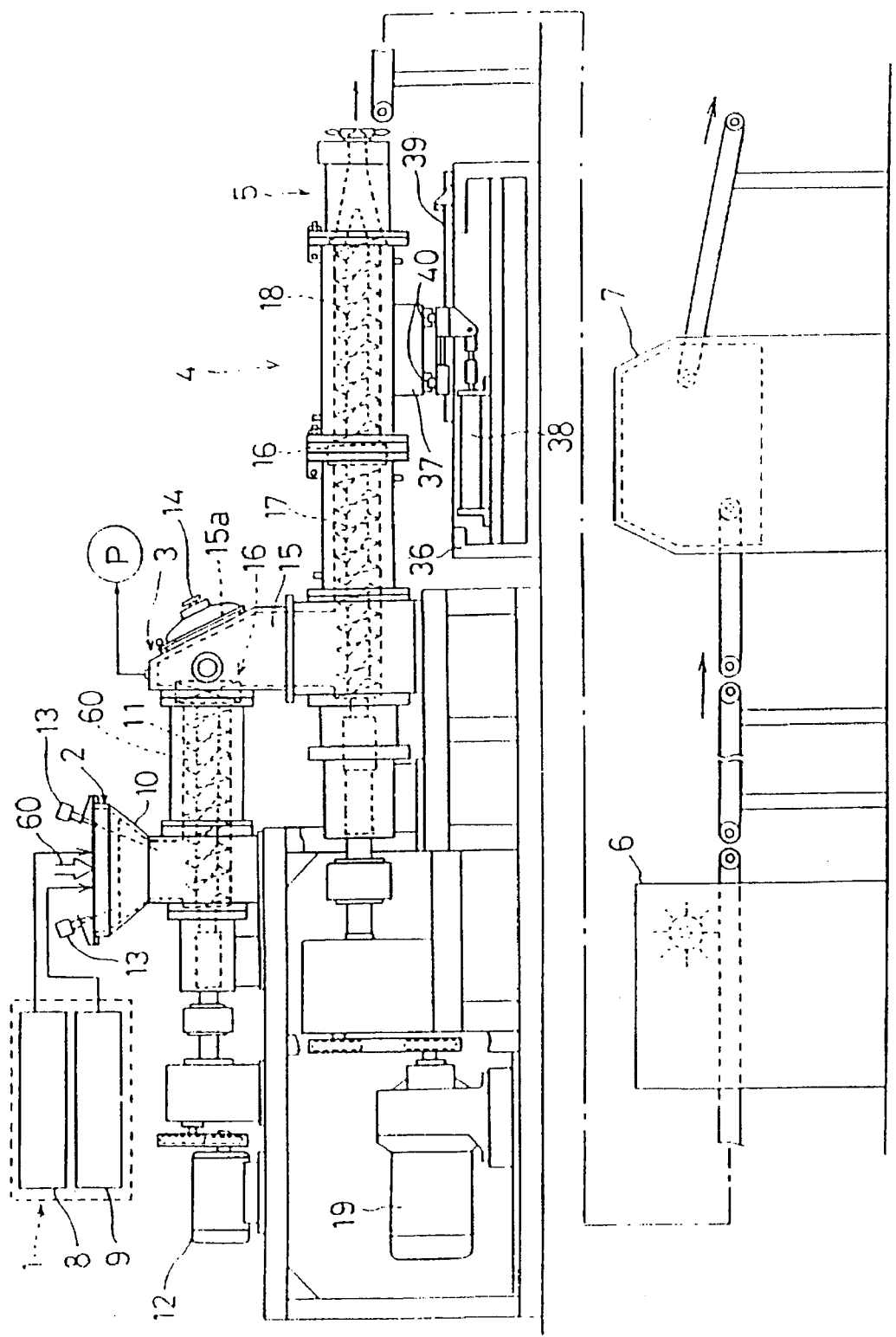
FIG. 1 is a side view showing, in its entirety, a mixing-kneading extruder apparatus according to one preferred embodiment of the present invention.

Preferred embodiments of a mixing-kneading extruder apparatus relating to the present invention will be described next in details with reference to the accompanying drawings.

FIGS. 1 through 5 show a mixing-kneading extruder apparatus according to one embodiment of the invention. This apparatus includes a metering device 1 for individually and continuously metering amounts of a plurality of kinds of raw materials to be processed, a receiver tank 2 for receiving the mixture material 60 (hereinafter, 'material') fed from the metering device 1, a degassing tank 3 for degassing the material 60, a mixing-kneading plodder device 4 for mixing and kneading the material 60 while plodding it, and an extruding mechanism 5 for extruding the material 60. Further, at the terminal end of the above-described serially disposed components of the mixing-kneading extruder apparatus, as after-processing devices for processing the extruded product, there are disposed, in series, an automatic dicing device 6 and an automatic stamping device 7.

The metering device 1 includes a first metering unit 8 for metering and supplying raw material and a second metering unit 9 for metering and supplying such materials as aromatic agents and coloring agents, with the two metering units 8, 9 being disposed upstream of the receiver tank 2 for charging the material 60 relative to a supplying direction of the material 60.

The receiver tank 2 includes a charging hopper 10 constituting a mixing area for stirring and mixing the material 60. The hopper 10 includes a horizontally disposed preplodder worm shaft 11 extending through a bottom region of the hopper 10 from the forward side to the rear side, so as to stir the charged material 60 and then forcibly discharging the stirred material 60 through a discharge opening formed at the bottom region.

The preplodder worm shaft 11 receives power from a drive motor 12 disposed on the upstream end thereof relative to the conveying direction of the material 60, and at the rear, i.e. downstream end of the shaft 11, there is provided a levigating mechanism 16 which is substantially identical to a further levigating mechanism 16 provided to the mixing-kneading plodder device 4 to be described later. In operation, by the forcible plodding action by the preplodder worm shaft 11, the material 60 is moved downstream to pass through the levigating mechanism 16.

Incidentally, the discharging amount of the material 60 from the receiver tank 2 and the supplying amount of the material 60 from the metering device 1 are set to be substantially same as each other so that a predetermined same amount of material 60 may be always present inside the receiver hopper 10 of the receiver tank 2. More particularly, a pair of level sensors 13 are provided inside the receiver hopper 10 for detecting an upper limit level and a lower limit level of the material 60, and an unillustrated control device controls the supplying amount of the metering device 1 to allow the upper surface level of the material 60 to be confined between these upper and lower limit levels.

The degassing tank 3 includes a vacuum chamber 15 for forming a degassing region in which the material 60 on its way to the mixing-kneading plodder device 4 is subjected to a reduced pressure for reducing air content of the material 60. The vacuum chamber 15 is communicated with an unillustrated vacuum pump, and also a passage extending from the receiver hopper 10 to the preplodder worm shaft 11 is closed by the presence of the material 60 therein. Accordingly, the inner space of this vacuum chamber 15 may be used as an evacuating space. By maintaining this space under the pressure-reduced state, the material 60 may be degassed.

The vacuum chamber 15 has an opening 16a located on an extension of the axis of the preplodder worm shaft 11 and a lid 14 capable of opening/closing this opening 15a. By opening this lid 14, maintenance operations such as attachment or detachment of the shaft member of the preplodder worm shaft 11 or detachment of the levigating mechanism 16 provided at the axial end may be effected with ease through this opening 15a.

As shown in FIGS. 1 through 4, the mixing-kneading plodder device 4 includes a pair of plodder worm shafts consisting of a first plodder worm shaft 17 disposed upstream and a second plodder worm shaft 18 disposed downstream and the levigating mechanism 16 interposed between these plodder shafts 17, 18. And, this device 4 is connected and communicated with the vacuum chamber 15 provided downwardly of the degassing tank 3, so that the inner space of this mixing-kneading plodder device 4 too is maintained under the pressure-reduced state by the function of the vacuum pump. Accordingly, the material 60 plodded by the two plodder worm shafts 17, 18 is plodded under the pressure-reduced state and subjected to the levigating action under this condition. The first plodder worm shaft 17 and the second plodder worm shaft 18 respectively include plodder shaft members 17A, 18A and cylinders 17B, 18B incorporating therein the respective worm shaft members 17A, 18A. And, the levigating mechanism 16 is disposed between the upstream first worm shaft member 17A and the downstream second worm shaft member 18A and between the two cylinders 17B, 18B respectively incorporating therein the two shaft members 17A, 18A.

Figure 3:
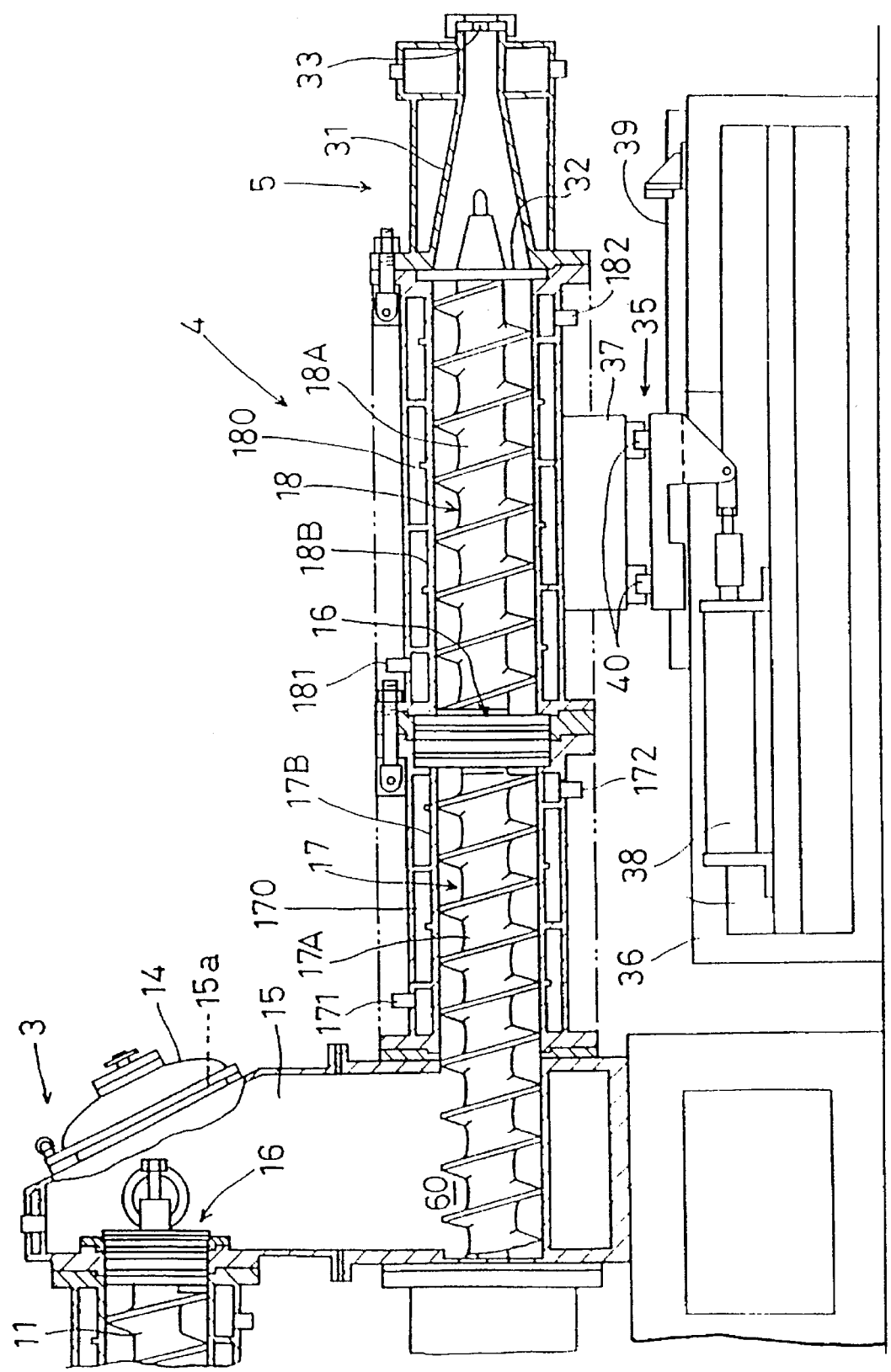
FIG. 3 is a section view showing a portion of the mixing-kneading extruder apparatus.

As shown in FIG. 3, around the outer periphery of the cylinder 17B, there is provided a cooling water passage 170 for cooling the plodded material. This cooling water passage 170 supplies cooling water from an inlet opening 171 and discharges the cooling water from an outlet opening 172. More particularly, the cooling water passage 170 is extended in a spiral form about the outer periphery of the cylinder 17B, so that the cooling water supplied from the inlet opening 171 flows along the spiral pattern about the outer periphery of the cylinder 17B to cool this cylinder 17B. In the course of this, heat exchange takes place between this cooled cylinder 17B and the hot material 60 plodded therein, whereby the material 60 is cooled.

A similar cooling mechanism is provided also about the outer periphery of the other cylinder 18A, and this mechanism includes an inlet opening 181 for supplying the cooling water, a cooling water passage 180 in and along which the cooling water may circulate and an outlet opening 182 for discharging the cooling water after its circulation through the cooling water passage 180.

Figure 2:
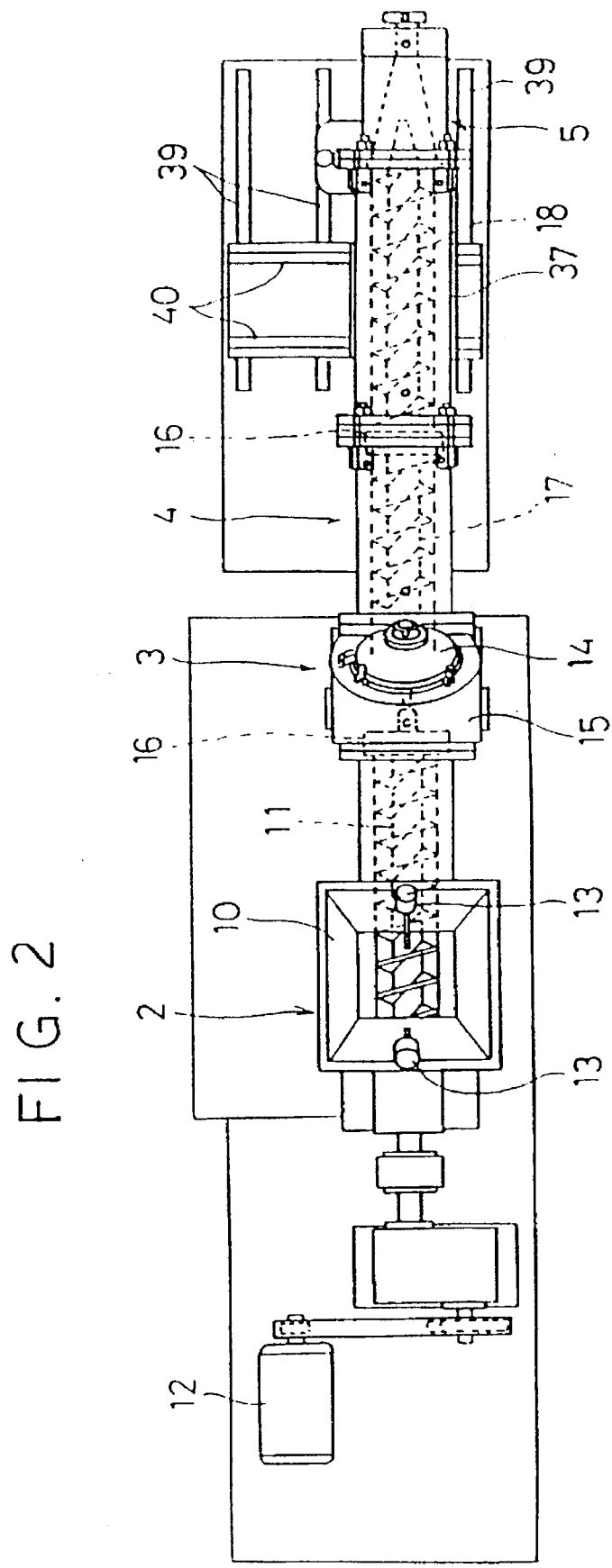
FIG. 2 is a plan view showing the entire mixing-kneading extruder apparatus.

Incidentally, for activating these cooling mechanisms, though not shown, outside the mixing-kneading extruder apparatus shown in FIGS. 2 and 3, there are provided a pump for feeding the cooling water to the inlet openings 171, 181, a tank for storing the cooling water discharged from the outlet openings 172, 182, and a flow rate controlling device for controlling the flow rate of the cooling water. Hereinafter, these mechanisms will be generically referred to as a cylinder outer-periphery temperature control device.

Referring again to the plodder worm shafts 17, 18, the upstream worm shaft member 17A has a worm pitch slightly greater than that of the downstream worm shaft member 18A. Then, these worm shafts are driven by an electric motor 19 via an appropriate reduction mechanism at a revolution of 5–30 rpm approximately.

Next, the levigating mechanism 16 will be more particularly described.

The levigating mechanism 16 includes a plurality of unit levigating mechanisms 20 disposed side by side along the plodding direction of the material 60.

Figure 4:
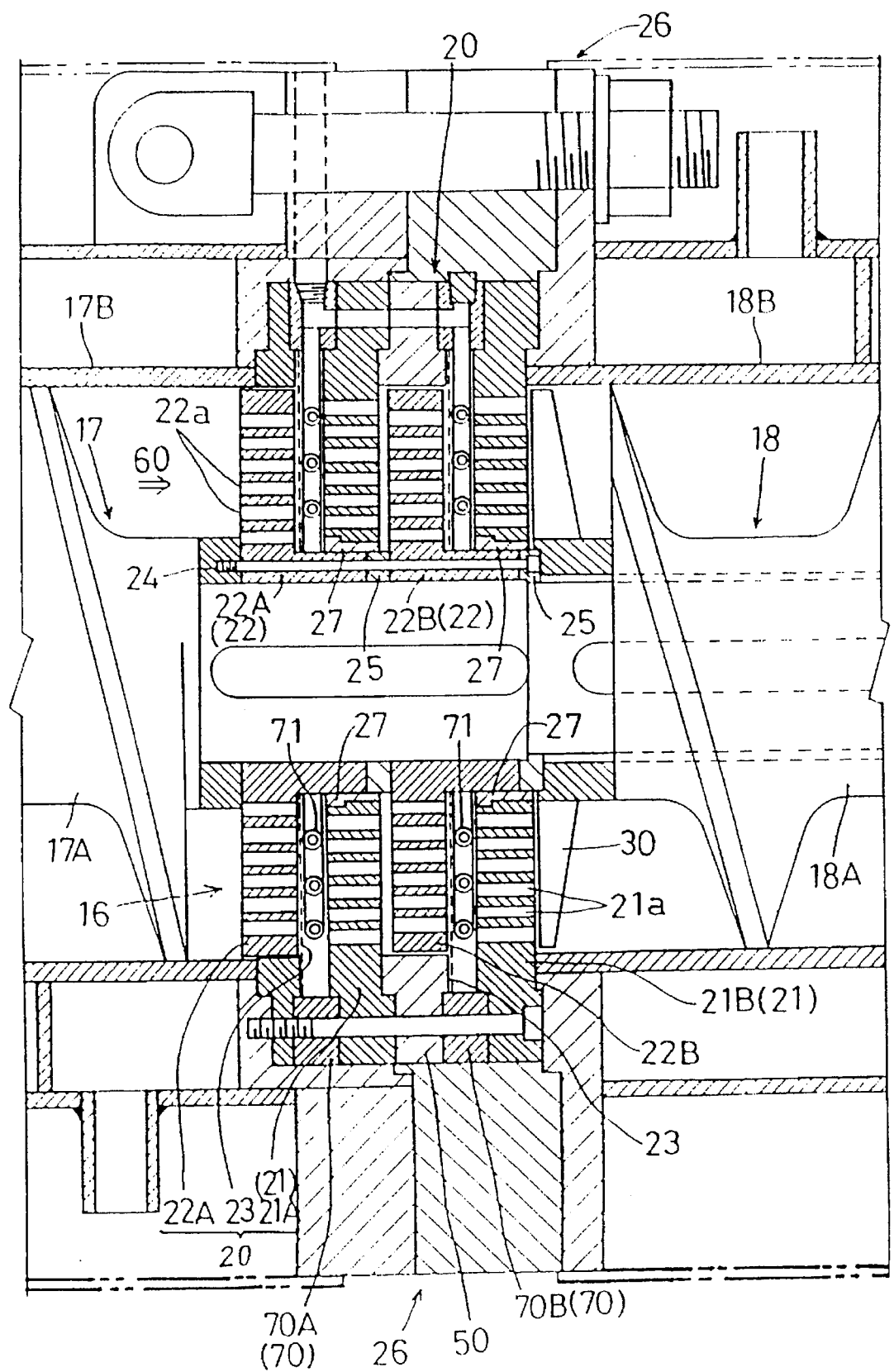
FIG. 4 is an enlarged section view of the mixing-kneading extruder apparatus, showing its levigating mechanism in particular.

As shown in FIGS. 3 and 4, each unit levigating mechanism 20 is connected to a plodding terminal end of the first plodder worm shaft member 17A to be rotated in unison with this first plodder worm shaft member 17A. Further, the levigating mechanism 20 includes a rotary disc 22 defining a plurality of through holes 22a extending through in the direction of the axis of the shaft member and a fixed disc 21 defining a plurality of through holes 21a extending through in the direction of the shaft axis and fixedly disposed in opposition to the rotary disc 22 and between this disc 22 and the next unit levigating mechanism 20. The mechanism 20 further includes a filter 23 and a coil ring 70 interposed between the disc pair. The filter 23 and the coil ring 70 will be described in detail later.

In the instant embodiment, two unit levigating mechanisms 20 are provided. In the specific construction shown in the figures, the rotary disc 22A, the fixed disc 21A, the rotary disc 22B and the fixed disc 21B are arranged in the mentioned order from the upstream side in the material plodding direction, and an intermediate ring 50 and the coil spring 70 are interposed between the upstream fixed disc 21A and the downstream fixed disc 21B.

With the above-described construction in operation, in the course of its forcible passage between the fixed disc 21 and the rotary disc 22 rotated relative thereto, the material 60 is subjected to a strong levigating action to be mixed and kneaded thereby.

In the rotary disc 22 and the fixed disc 21, the material through holes 22a, 21a are respectively formed with an opening area ratio of 50% approximately. Hence, when the material 60 which has been present within the first plodder worm shaft 17 is forcibly passed through the through holes 22a, 21a, this material is moved at a speed about twice faster than the plodding speed by the first plodder worm shaft 17. And, with such sudden acceleration forced by the pressure, plastic deformation occurs in this material 60 per se, by which the material may be levigated.

Further, between the two discs 21, 22, there is interposed the filter 23 having a plurality of through holes which are sufficiently smaller in diameter than the through holes 21a, 22a of the discs. Thus, the material 60 is more finely dispersed or filtered in the course of the levigation through the discs, so that the material is subjected to a further kneading action due to this filtering action as well. With these kneading and filtering actions combined, a levigating operation with high precision may be effected.

As shown in FIG. 4, the first plodder worm shaft member 17A and the second plodder worm shaft member 18A are keyed to each other to be rotatable in unison, and the first plodder worm shaft member 17A is keyed also with the upstream rotary disc 22A.

The downstream rotary disc 22B is fixedly connected with the first plodder worm shaft member 17A by means of a plurality of attaching bolts 24. Further, between the two rotary discs 22A, 23B, a spacer 25 having through holes for allowing insertion of the attaching bolts 24 is mounted on the plodder worm shaft member 17A. That is to say, the three kinds of members, i.e. the first plodder worm shaft member 17A, the rotary discs 22 and the spacer 25 are fixedly connected to each other via the attaching bolts 24 to be rotatable in unison.

The fixed disc 21 is fixed to a casing 26 of the levigating mechanism 16 constituted by the connecting portion between the first cylinder 17B incorporating therein the first plodder worm shaft member 17A and the second cylinder 18B incorporating therein the second plodder worm shaft member 18A.

This fixed disc 21 rotatably supports the first plodder worm shaft member 17A via a resin bearing 27 fitted on the spacer.

Figure 5:
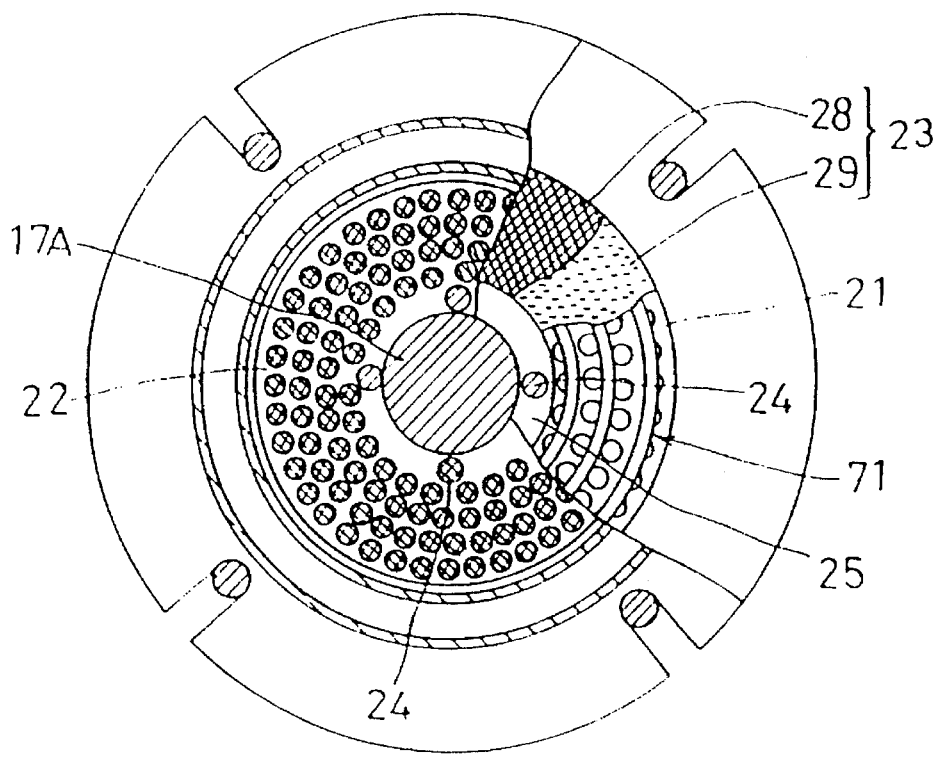
FIG. 5 is a partial section view of the apparatus as viewed along an axis thereof.

The filter 23, as shown in FIG. 5, comprises a combination of a disc mesh 28 having a meshing needed for filtering the material and a punching plate 29 having a number of punch holes smaller than the through holes 21a, 22a of the two discs 21, 22. And, as shown in FIGS. 5 and 4, this filter is attached between the fixed disc 21 and the rotary disc 22. Accordingly, the fixed disc 21 is fixed to the cylinder. Incidentally, the specific shape of each of the through holes 21a, 22a is not limited to the horizontally cylindrical shape shown in the drawings, but may be angular cylindrical or spiral extending about the moving direction of the material.

In this filter 23, the disc mesh 28 is disposed on the upstream side in the conveying direction of the material 60 and the punching plate 29 is disposed behind the mesh 28 so as to compensate for the loss in the strength of the disc mesh 28 which occurs when the through holes 21a of the fixed disc 21 are slightly enlarged so as to restrict occurrence of clogging of the holes with the material.

Also, the filter 23 is disposed in front of the fixed disc 21 and the coil ring 70 with forming a clearance of 0.5-3 mm approximately with the upstream rotary disc 22. The disc mesh 28 is formed of metal material (e.g. stainless steel, JIS SUS 304). For mixing-kneading of the raw soap material, the meshing of this disc mesh preferably ranges between #20 and #50. The punching plate 29 too is formed of similar metal material (e.g. stainless steel, JIS SUS 304) and has a thickness of about 0.8–2.0 mm, a pore diameter of about 0.5–2.0 mm, and an opening area ratio of about 25–50%. And, these punching plate 29 and the disc mesh 28 are bonded together through peripheral edges thereof bonded to each other by means of such appropriate bonding means as soldering.

The meshing of the disc mesh 28 and the thickness, pore diameter and opening area ratio of the punching plate 29 and also the clearance relative to the rotary disc 22 are determined as described above, since these settings have been found to be suitable for obtaining an appropriate ratio between ω type crystals and β type crystals in the raw soap material when the raw soap material is employed as the material 60 to be processed. Specifically, if the meshing, pore diameter, opening area ratio and the clearance are set far apart from the above-described respective ranges, the kneading of the material 60 becomes insufficient, lacking in the content of the β type crystals, or conversely, the kneading of the material 60 becomes excessive, lacking in the content of the ω type crystals. Soap containing a large amount of ω type crystals is hard to dissolve. On the other hand, soap containing a large amount of β type crystals bubbles well. Therefore, these values may be set within the above-described respective ranges, depending on which content of the two types of crystals is considered more important than the other for a particular application. Further, it is preferred that a plurality of kinds of filters 23 having differing set values be prepared in advance to be selectively used.

Incidentally, a numeral 30 in FIG. 4 denotes a cutter blade fixedly connected to the first plodder worm shaft member 17A and disposed to face the downstream side of the last fixed disc 21.

Next, a temperature control system 200 for the levigating mechanism 16 will be described.

Figure 7:
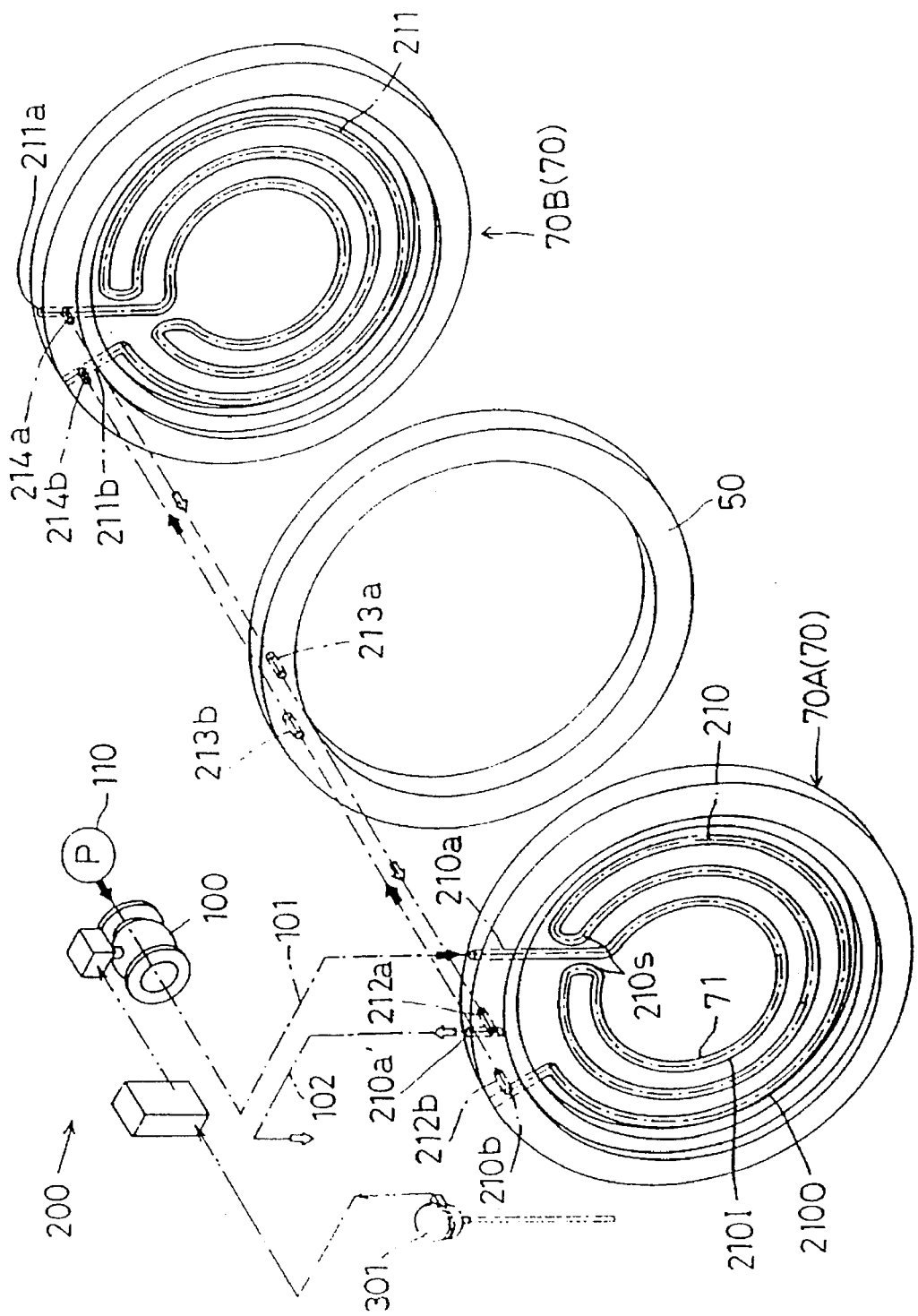
FIG. 7 is a descriptive view illustrating a construction of a temperature control system and temperature controlling means.
Figure 8:
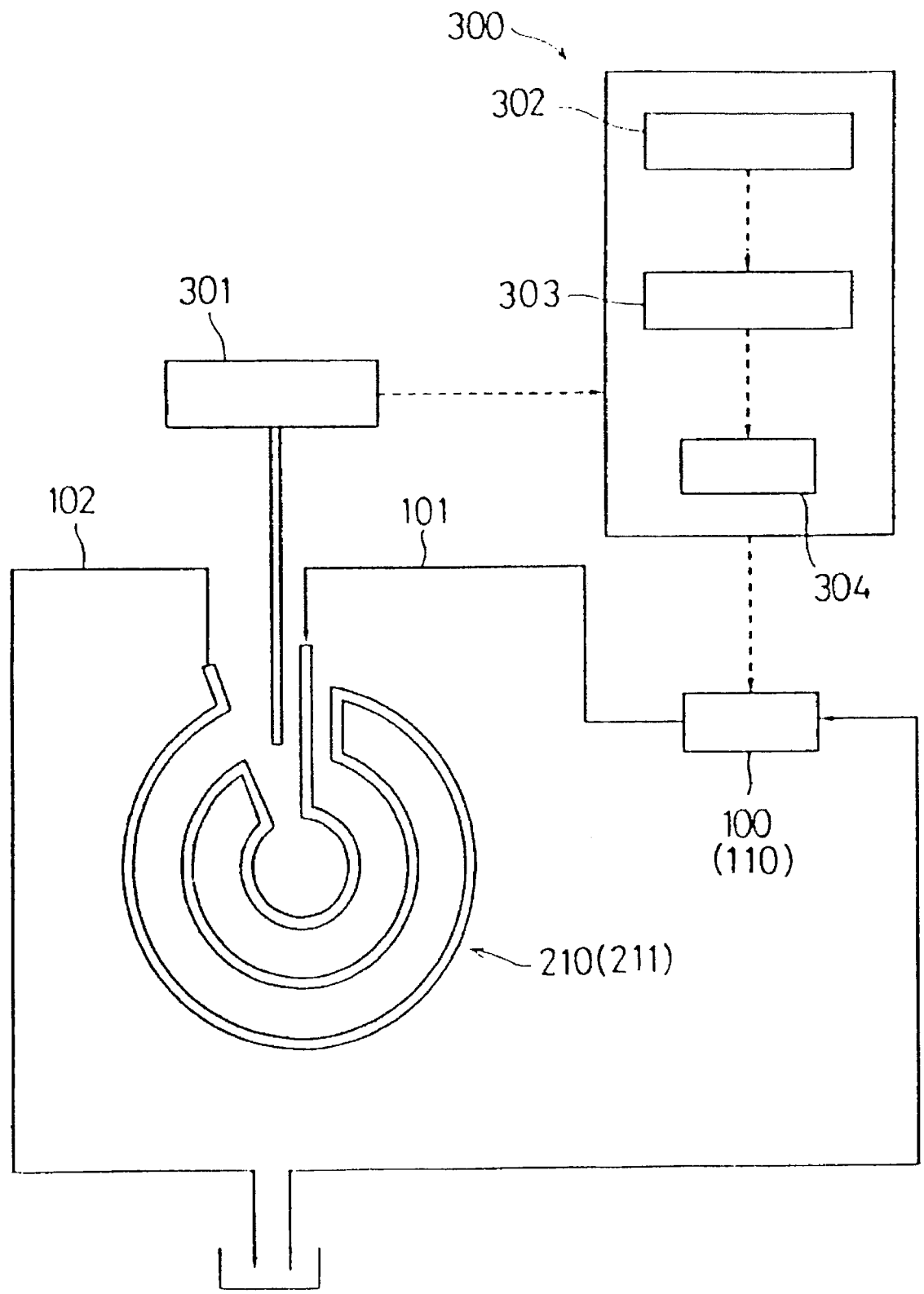
FIG. 8 is a block diagram of a feedback control of the temperature controlling means.

As shown in FIGS. 7 and 8, this temperature control system 200 for the levigating mechanism 16 is incorporated within the coil ring 70A, 70B respectively disposed upstream of the upstream fixed disc 21A and the downstream fixed disc 21B. The coil rings 70A, 70B respectively include a flow passage 210 (to be referred to as a first flow passage hereinafter) and a flow passage 211 (to be referred to as a second flow passage hereinafter) each constructed from a piping 71 as a flow passage forming member. These coil rings 70A, 70B and the intermediate ring 50 include flow passages 212a, 212b, 213a, 213b, 214a, 214b horizontally extended to communicate the first flow passage 210 and the second flow passage 211 with each other, and further flow passages 210a, 210a', 210b, 211a, 211b extended substantially in the radial direction of the cylinder 17B.

There are further provided a pump 110 as fluid supplying/exhausting means for supplying the cooling water to the flow passages and exhausting the water therefrom, a control valve 100 for the pump, a guide pipe 101 for guiding the cooling water from the pump 110 to the flow passage 210a, and a further guide pipe 102 for exhausting the cooling water having circulated through the flow passage formed in the intermediate ring 50.

Next, the construction of the circuit of the cooling water will be described.

First, the cooling water pumped from the pump 110 is supplied via the guide pipe 101 to an inlet opening of the flow passage 210a of the coil ring 70A disposed upstream relative to the upstream fixed disc 21A. Then, this water circulates through the first flow passage 210 to directly cool the material 60 and then is guided via the flow passages 214b, 211b of the coil ring 70B disposed upstream relative to the downstream fixed disc 21B into the second flow passage 211. Thereafter, the cooling water runs through the second flow passage 211 to again cool the material 60 and then the water is guided via the flow passage 213a formed in the intermediate ring 50 and the flow passages 212a, 210a' into the exhausting guide pipe 102 to be discharged into a tank (not shown).

Within the moving passage of the material 60, the first flow passage 210 includes an outer loop portion 210O as an outer flow passage portion extending peripherally along a radially outer portion and an inner loop portion 210I as an inner flow passage portion extending peripherally along a radially inner portion, and two communicating flow passages 210s, 210s for communicating the outer loop portion 210O and the inner loop portion 210I with each other. With this construction, the material 60 may be cooled from both the inner peripheral side and the outer peripheral side thereof.

As shown in FIG. 7, the second flow passage 211 has a similar configuration to that of the first flow passage 210.

Next, with reference to FIG. 8, temperature controlling means 300 for controlling the temperature of the cooling water will be described.

The temperature controlling means 300 includes a temperature sensor 301 incorporated within the fixed disc 21 for measuring the temperature of this fixed disc 21, a temperature setting unit 302 for setting the temperature of the fixed disc 21, a comparing calculating unit 303 for comparing and calculating a difference between the temperature measured by the temperature sensor 201 and the temperature set by the temperature setting unit 302, and a controller 304 for issuing an instruction for controlling an opening/closing degree of the control valve 100 thereby controlling the flow rate of the cooling water. In the above, the controller 304 is constructed to control the control valve 100 in such a manner that the greater the difference between the measured temperature and the set temperature of the fixed disc, the larger the flow amount of the cooling water supplied from the pump 110, thus the higher the flow rate of the fluid, i.e. cooling water circulating through the first and second flow passages 210, 211.

Incidentally, the fluid supplying/exhausting means includes the pump 110 and the control valve 100 having the opening/closing degree thereof controllable. Further, the control valve 100 may be incorporated within the pump 110.

Referring back to FIG. 3, the extruding mechanism 5 includes a constricted cylinder member 31 connected to the terminal end of the second cylinder 18B to be pivotable about a vertical axis relative thereto, a rectifying plate 32 disposed forwardly of the constricted cylinder member 31 and defining a number of pores, and an extruder die 33 disposed rearwardly of the constricted cylinder member 31.

As shown in FIGS. 1 through 3, downwardly of the mixing-kneading plodder device 4, there is provided a moving device 35 for supporting the second plodder worm shaft 18 and allowing adjustment of the position of the shaft 18 in the forward and rear directions as well as in the right and left directions when this downstream second plodder worm shaft 18 is to be dismounted.

The moving device 35 includes a stationary table 36, a movable table 37 longitudinally movable relative to the stationary table 36, a pneumatic expandable cylinder 38 as drive means for driving the movable table 37 along the longitudinal direction of the plodder worm shaft, a first guide rail 39 mounted on the stationary table 36 for guiding the movable 37 along the longitudinal direction of the second plodder worm shaft 18 and a second guide rail 40 for moving the movable table 37 in a direction normal to the first guide rail 39. Incidentally, with this moving device 35, for moving the second plodder worm shaft 18 on the movable table 37 in the direction normal to the longitudinal direction, the shaft 18 is manually pushed from the lateral side thereof to be guided along the laterally oriented second guide rail 40.

The automatic dicing device 6 is a well-known cutter device disposed downstream of the above-described multistage vacuum extruder in the plodding/extruding direction of the material for cutting the bar-shaped elongate material 60 extruded from the extruder die 33 into material pieces of a predetermined uniform length.

The automatic stamping device 7 is a well-known stamping device disposed downstream of the automatic dicing device 6 for stamping a predetermined mark or logo or the like on the material 60 introduced in the device 7.

In the foregoing description, the levigating mechanism 16 is disposed at an intermediate position in the conveying direction of the material 60. As described hereinbefore, the mixing-kneading extruder apparatus of this invention includes the degassing tank 3, and a further levigating mechanism 16 is provided adjacent the entrance of this degassing tank 3.

Figure 9:
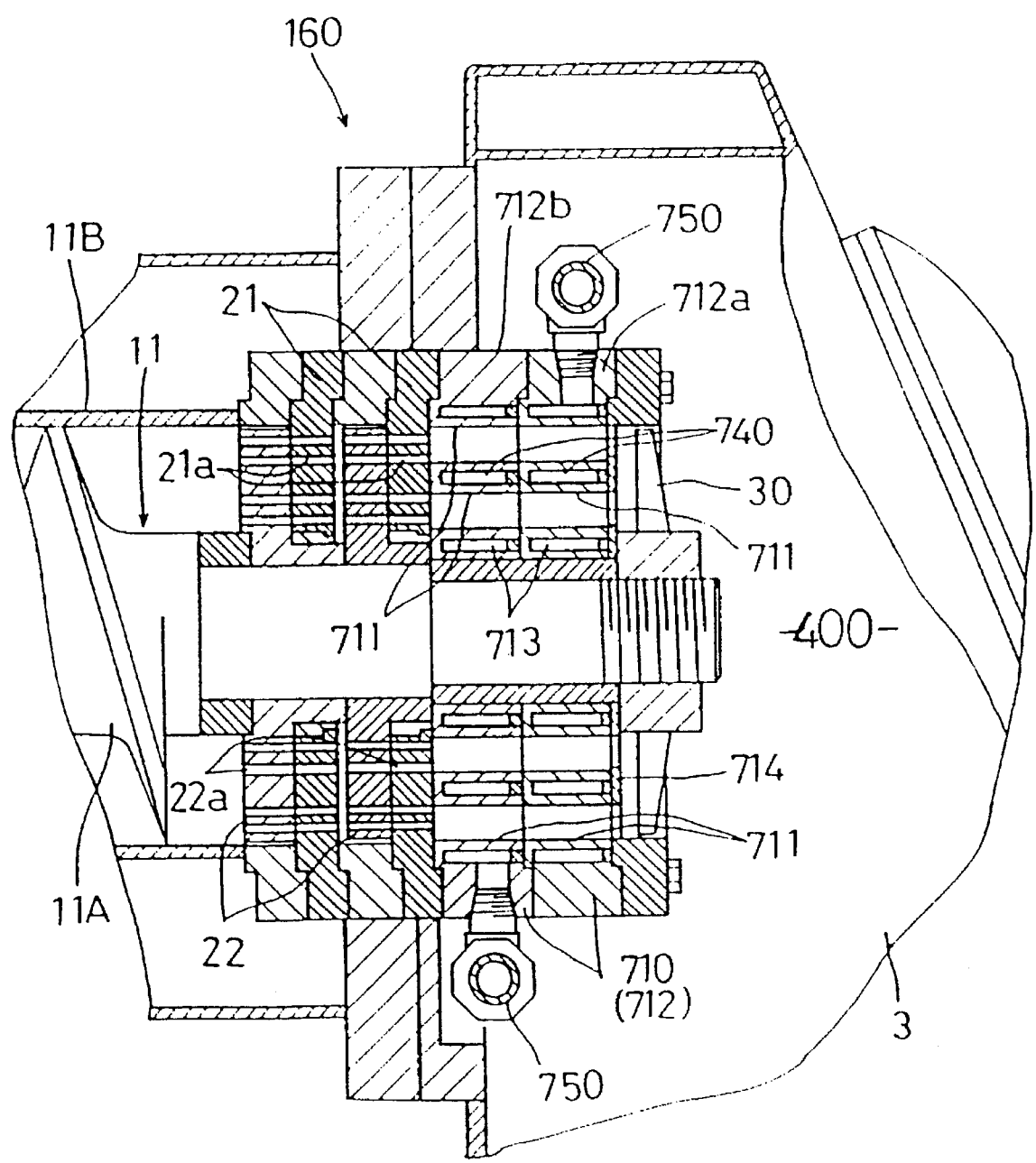
FIG. 9 is a view showing a levigating mechanism according to a further embodiment of the invention.
Figure 10:
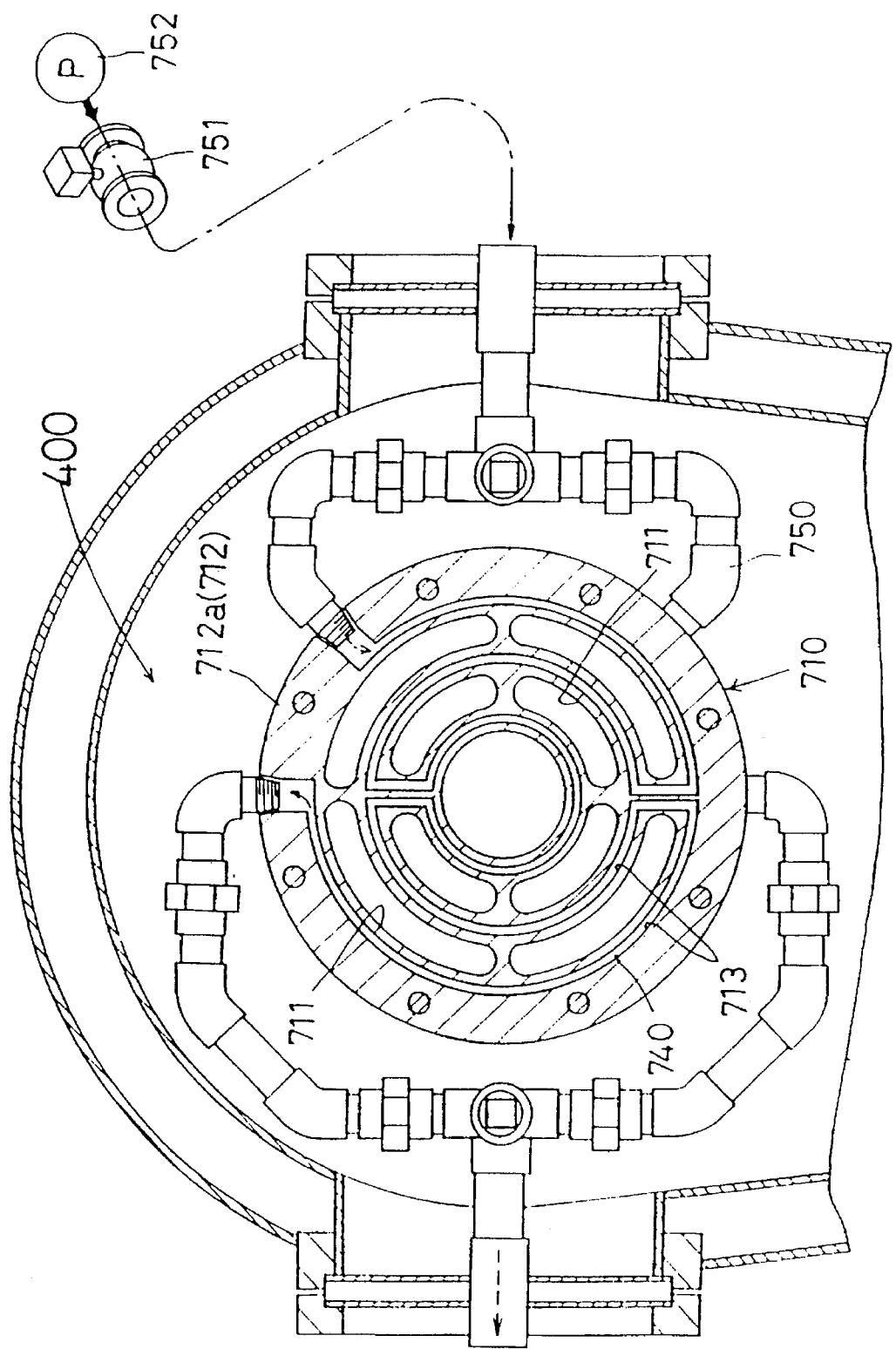
FIG. 10 is a view showing the levigating mechanism of FIG. 9 as viewed from a side of a degassing tank.

This levigating mechanism 16 may have the same construction as described hereinbefore, or may have an alternative construction as shown in FIGS. 9 and 10. FIG. 9 corresponds to FIG. 4 and shows details of a levigating mechanism 160 having the alternative construction. And, FIG. 10 is a section view of this levigating mechanism 160 as viewed from the side of the degassing tank 3 (section of an end face flow passage forming member 710).

In this further embodiment, like the foregoing embodiment, there are provided two pairs of rotary discs 22 and fixed discs 21. And, downstream of these discs 21, 22, the end face flow passage forming member 710 is disposed to face the inner space 400 of the degassing tank 3, and a cutter blade 30 is provided further downstream.

The rotary discs 22 and the cutter blade 30 are rotatable in union with the worm shaft member 11A of the preplodder worm shaft 11. The fixed discs 21 are fixed to the cylinder 11B incorporating therein the shaft member 11A.

Like the flow passage forming member 71 described hereinbefore, this end face flow passage forming member 710 defines a plurality of through holes 711 for allowing passage therethrough of the material 60. And, for this end face flow passage forming member 710 too, there is provided the fluid supplying/exhausting means for supplying the fluid of a predetermined temperature at a predetermined flow rate and exhausting the fluid from this end face flow passage forming member 710.

Next, this end face flow passage forming member 710 will be particularly described.

As shown, the end face flow passage forming member 710 includes a plate-like member 712 disposed within the moving passage of the material 60 and transversing the passage and defining grooves 713 defined in the plate-like member 712 along the width thereof, and a lid member 714 for engaging the plate-like member 712 along the direction of the width thereof for covering the grooves 713. And, a flow passage 740 allowing passage therethrough of the fluid of the predetermined temperature is formed as a space defined between the plate-like member 712 and the lid member 714.

As shown, in this embodiment, a pair of the plate-like members 712 are provided. Also, the lid member 714 is provided to the plate-like member 712a facing the inner space 400 of the degassing tank 3. Further, the plate-like member 712a disposed on the side of the degassing tank 3 functions also as a lid member for the upstream plate-like member 712b. Each plate-like member 712 may be independently supplied with the fluid for temperature control, and for each fluid supplying pipe 750, there are provided such devices as a control valve 751, a pump 752 for supplying and exhausting the fluid, i.e. the fluid supplying/exhausting means.

Then, this end face flow passage forming member 710 may be used in place of the flow passage forming member 71 described hereinbefore.

Next, some other embodiments of the invention will be specifically described.

(1) In the foregoing embodiment, the levigating mechanism 16 includes two unit levigating mechanisms 20. Instead, the mechanism 16 may include only one or more than three unit levigating mechanisms 20.

Figure 6:
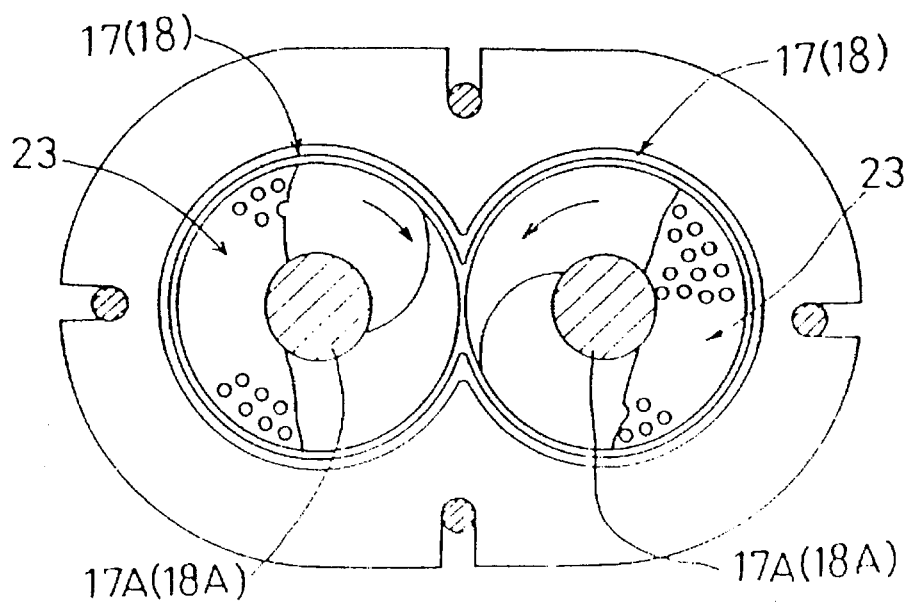
FIG. 6 is a descriptive view illustrating a portion of a mixing-kneading extruder apparatus according to a further embodiment of the invention.

(2) In the foregoing embodiment, the mixing-kneading extruder apparatus using the temperature control system comprises the single plodder worm shaft type as shown in FIG. 5. Instead, as shown in FIG. 6, the apparatus may employ a multi or double plodder worm shaft type having two or more plodder shafts 17, 18 disposed side by side in parallel with each other, for treating the material 60 fed from the degassing tank 3 through two or more passages in parallel.

In this case, the filter 23 too will be provided in a number corresponding to the number of the plodder shafts selected, with portions of the peripheral edges of the filters being connected together.

(3) In the foregoing embodiment, there are used in combination the temperature control system provided within the levigating mechanism and the cylinder outer-periphery temperature control device provided about the outer periphery of the cylinder and including the cooling water passage extending in the spiral pattern along the axis of the cylinder. Instead, the cylinder outer-periphery temperature control device may be eliminated.

(4) Some kinds of soap need to be maintained at an elevated temperature. Thus, the fluid defined in the foregoing embodiment is not limited to the cooling water, but is understood to include any heated medium as well. Further, as cooling fluid or medium, other substance such as ethylene glycol (antifreeze liquid) may be used.

(5) Instead of the raw soap material described in the foregoing embodiments, the mixing-kneading extruder to which the present invention is applied may be used for processing any other material such as oils, fats, food products, pharmaceutical products and so on.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An apparatus for mixing, kneading and extruding material, the apparatus comprising:

a cylinder having a rotatable plodder worm shaft for plodding material to be processed in an axial direction of the worm shaft;

a levigating mechanism disposed at a longitudinal position of the cylinder for levigating the material, the levigating mechanism including a rotary disc rotatable with the plodder worm shaft and a fixed disc fixed to the cylinder, with the rotary disc and the fixed disc being disposed side by side along the axial direction of the plodder worm shaft, and with the rotary disc and the fixed disc defining a plurality of through holes for allowing passage of the material in the axial direction;

a flow passage forming member disposed within a moving passage of the material between the rotary disc and the fixed disc and forming therein a flow passage for allowing passage therethrough of fluid maintained at a predetermined temperature; and fluid supplying/exhausting means for supplying the fluid at a predetermined flow rate to the flow passage of the flow passage forming member and exhausting the fluid from the flow passage forming member.

2. An apparatus as claimed in claim 1, wherein the flow passage forming member includes an inner flow passage portion disposed radially inwardly relative to an axis of the moving passage and an outer flow passage portion disposed radially outwardly relative to the moving passage axis.

3. An apparatus as claimed in claim 2, wherein the flow passage forming member is located upstream of the fixed disc as viewed in a moving direction of the material.

4. An apparatus as claimed in claim 1, further comprising a cylinder outer periphery temperature controlling device disposed around an outer periphery of the cylinder and forming therein a flow passage through which fluid may pass.

5. An apparatus for mixing, kneading and extruding material, the apparatus comprising:

a cylinder having a longitudinal terminal end and a rotatable plodder worm shaft for plodding material to be processed therewith;

a levigating mechanism disposed at the longitudinal terminal end of the cylinder for levigating the material, the levigating mechanism including a rotary disc rotatable with the plodder worm shaft and a fixed disc fixed to the cylinder, with the rotary disc and the fixed disc disposed side by side along an axial direction of the plodder worm shaft, the rotary disc and the fixed disc defining a plurality of through holes for allowing passage of the material in the axial direction;

a conveying passage having a degassing tank disposed in the middle of the conveying passage of the material, the degassing tank having an evacuated inner space, the levigating mechanism being disposed adjacent an entrance of the degassing tank for introducing the material into the degassing tank;

a through hole provided on a downstream side of the fixed disc and the rotary disc relative to a transporting direction of the material and in communication with the inner space of the degassing tank for allowing passage of the material through the through hole;

an end face flow passage forming member disposed on the downstream side of the fixed disc and the rotary disc relative to the transporting direction of the material and in communication with the inner space of the degassing tank and forming therein a flow passage for allowing passage of a fluid of a predetermined temperature through the flow passage; and fluid supplying/exhausting means for supplying the fluid of a predetermined temperature at a predetermined flow rate to the flow passage of the end face flow passage forming member and exhausting the fluid from the end face flow passage forming member.

6. An apparatus as claimed in claim 5, wherein the end face flow passage forming member includes:

a plate-like member disposed within the moving passage of the material and transversing the moving passage and defining a groove; and a lid member for covering the groove by engaging the plate-like member along a width thereof, wherein the flow passage is formed by a space defined between the plate-like member and the lid member.

7. An apparatus as claimed in claim 6, including a first plate-like member and a second plate-like member, with the first plate-like member located on a side of the degassing tank facing an inner space of the degassing tank and the second plate-like member located upstream of the first plate-like member, said lid member configured to engage the first plate-like member, and wherein the first plate-like member functions as a lid member for the second plate-like member.

8. An apparatus as claimed in claim 7, wherein each said plate-like member may be independently supplied with the fluid of a predetermined temperature.

* * * * *